United States Patent
Isano

(10) Patent No.: US 8,120,848 B2
(45) Date of Patent: Feb. 21, 2012

(54) WAVEPLATE UTILIZING FORM BIREFRINGENCE AND WAVEPLATE MANUFACTURING METHOD

(75) Inventor: Taisuke Isano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 11/948,343

(22) Filed: Nov. 30, 2007

(65) Prior Publication Data
US 2008/0158674 A1   Jul. 3, 2008

(30) Foreign Application Priority Data
Dec. 27, 2006 (JP) ................... 2006-351095

(51) Int. Cl.
*G02B 5/30* (2006.01)
(52) U.S. Cl. .................................. 359/485.05
(58) Field of Classification Search .............. None
See application file for complete search history.

(56) References Cited

U.S. PATENT DOCUMENTS

| | | | |
|---|---|---|---|
| 5,982,545 A | 11/1999 | Su | |
| 7,554,734 B1 * | 6/2009 | Holm et al. | 359/576 |
| 2003/0156325 A1 | 8/2003 | Hoshi | |
| 2005/0128592 A1 | 6/2005 | Nishii et al. | |
| 2005/0191467 A1 | 9/2005 | Isano | 428/172 |
| 2008/0225389 A1 * | 9/2008 | Oh et al. | 359/486 |

FOREIGN PATENT DOCUMENTS
JP         62-269104        11/1987

OTHER PUBLICATIONS

Callard S. et al., "Fabrication and Characterization of Graded Refractive Index Silicon Oxynitride Thin Films" Journal of Vacuum Science and Technology: vol. 15, No. 4, Jul./Aug. 1997, pp. 2008-2094, XP-001154156.

Dale C. Flanders, "Submicrometer Periodicity Gratings as Artificial Anisotropic Dielectrics," Applied Physics Letters, vol. 42, pp. 492-494 (Mar. 15, 1983).

* cited by examiner

*Primary Examiner* — Lee Fineman
(74) *Attorney, Agent, or Firm* — Fitzpatrick, Cella, Harper & Scinto

(57) ABSTRACT

A waveplate including a dielectric substrate and a periodic structure formed on the dielectric substrate, said periodic structure having a period which is equal to or smaller than a wavelength of an incident light, wherein the periodic structure is constructed of a deposited film, and a refractive index of the deposited film gradually changes in a thicknesswise direction of the deposited film.

8 Claims, 5 Drawing Sheets

WAVEPLATE UTILIZING FORM BIREFRINGENCE AND WAVEPLATE MANUFACTURING METHOD

BACKGROUND OF THE INVENTION

1. Field of the Invention

The present invention relates to a waveplate such as a ¼ waveplate, a ½ waveplate and a full waveplate (optical waveplate) and to a waveplate manufacturing method.

2. Description of the Related Art

A waveplate used for a variety of optical apparatuses has hitherto been manufacturing by polishing a crystal of quartz. The waveplate is adjusted to such a thickness that a phase retardation between an ordinary light and an extraordinary light becomes an (N+¼) wavelength in the ¼ waveplate, an (N+½) wavelength in the ½ waveplate and an N wavelength (N is an integer) in the full waveplate.

Other than these types of waveplates, a waveplate utilizing form birefringence is proposed in (D. C. Flanders, "Submicrometer Periodicity Gratings as Artificial Anisotropic Dielectrics," Applied Physics Letters, vol. 42, pp. 492-494, 15 Mar. 1983). The waveplate utilizing the form birefringence has gratings (micro-periodic structure) arranged with a smaller period than a wavelength (usage wavelength) of an incident light. The waveplate makes use of a phenomenon that let d be a grating pitch and λ be a usage wavelength, in an area where the grating pitch d is smaller than the wavelength λ, a refractive index $n_p$ in a direction parallel with the grooves of the gratings is different from a refractive index $n_c$ in a direction orthogonal to the grooves of the gratings.

According to (D. C. Flanders, "Submicrometer Periodicity Gratings as Artificial Anisotropic Dielectrics," Applied Physics Letters, vol. 42, pp. 492-494, 15 March 1983.) given above, when a sectional shape of the grating is rectangular, the refractive indexes $n_p$ and $n_c$ are given by the following equations.

$$n_p = [n_1^2 q + n_2^2 (1-q)]^{1/2} \quad (1)$$

$$n_c = [(1/n_1)^2 q + (1/n_2)^2 (1-q)]^{1/2} \quad (2)$$

where $n_1$ is a refractive index of a medium 1, $n_2$ is a refractive index of a medium 2, q is an occupying ratio of the medium 1 during one period of the grating, and such a relation is established as $1 \geq q \geq 0$.

A magnitude Δn of the birefringence is given by the following equation.

$$\Delta n = |n_p - n_c| \quad (3)$$

Further, a phase retardation ΔΦ received by the light having the wavelength λ, which gets incident on the gratings with the magnitude Δn of the birefringence, is given by the following equation, where D is a groove depth of the gratings.

$$\Delta\Phi[\text{rad}] = (2\pi D/\lambda) \cdot \Delta n \quad (4)$$

From this equation (4), for obtaining a large phase retardation ΔΦ, the groove depth D of the gratings may be increased, or the magnitude Δn of the birefringence may be increased. This relation is established when the section of the gratings takes a sine-wave shape or a triangular-wave shape as well as when the section thereof takes a rectangular shape.

Mainly, the following two methods are given as methods of concretely manufacturing, based on the principle described above, the waveplate utilizing the form birefringence.

The first manufacturing method is that, at first, a photoresist is formed with the gratings by exposing the photoresist to the light on the basis of an interference exposure method, and a die is manufactured from the gratings. Next, the die is transferred onto a thermosetting resin or a photo-setting resin by a hot pressing method or an injection molding method, thus manufacturing the waveplate.

The second manufacturing method involves, in the same way as by the first manufacturing method, forming the gratings of the photoresist on a dielectric substrate. Next, however, with the photoresist being used as a mask, the dielectric substrate is etched by an ion etching method or a reactive ion etching method, thereby forming the gratings on the surface of the dielectric substrate. The waveplate is thus manufactured.

In the case of manufacturing this type of gratings by the first manufacturing method, a contact surface area between the medium and an electro-casting die conspicuously increases, and consequently a pull shearing force for exfoliation from the die surface rises. Therefore, the medium hardened when exfoliated is peeled off the dielectric substrate and remains on the die surface, resulting in a problem that the gratings can not be transferred with high accuracy.

Moreover, the second manufacturing method entails a long period of time for etching, and hence a thickness of a mask for a durable-against-etching photoresist increases, with the result that the mask for the photoresist is hard to form.

The gratings formed on the photoresist are transferred onto a substance, e.g., chromium, exhibiting high durability against etching, and, in the case of etching with this substance being used as a mask, the following problems arise.

Namely, if a groove of the grating is deepened, active species, ions and neutral particles, which reach the bottom of the groove, decrease in their numbers, and a progress of the etching is thereby hindered. Then, the gratings taking a desired sectional shape get hard to form.

This type of problem is caused without depending on the sectional shape of the gratings.

If the dielectric substrate is large in size, a problem is that intra-surface uniformity based on etching goes under an acceptable level, and a yield declines.

To cope with these problems, Japanese Patent Application Laid-Open Publication No. S62-269104 discusses a method of decreasing the depth of the groove by covering the gratings with a dielectric medium having a high refractive index. In this method, however, the groove has a narrow width, and it is therefore difficult to grow the dielectric medium down to the bottom of the groove.

Further, another known method is that the groove depth is decreased by manufacturing the gratings by using the dielectric medium having the high refractive index as a material. However, in the case of the dielectric medium having the high refractive index, the reflectance rises, and it is difficult to obtain the necessary and sufficient transmittance in terms of the optical element.

A known method contrived for solving this problem is a method of growing the dielectric medium having the small refractive index on the surface, however, reflection and scattering occur on an interface between the dielectric medium having the high refractive index and the dielectric medium having the low refractive index, and it is hard to acquire the transmittance that is as high as expected.

SUMMARY OF THE INVENTION

It is an illustrative object of the present invention to provide an easy-to-manufacture waveplate capable of solving any one of the problems given above.

According to one aspect of the present invention, a waveplate comprises a dielectric substrate (1) and a periodic structure (7) formed on the dielectric substrate, said periodic structure having a period which is and equal to or smaller than a wavelength of an incident light, wherein the periodic structure is constructed of a deposited film (10), and a refractive index of the deposited film gradually changes in a thicknesswise direction of the deposited film.

Further features of the present invention will become apparent from the following description of exemplary embodiments with reference to the attached drawings.

DESCRIPTION OF THE EMBODIMENTS

An exemplary embodiment of the present invention will hereinafter be described in detail with reference to the accompanying drawings.

First Embodiment

Figure 1:
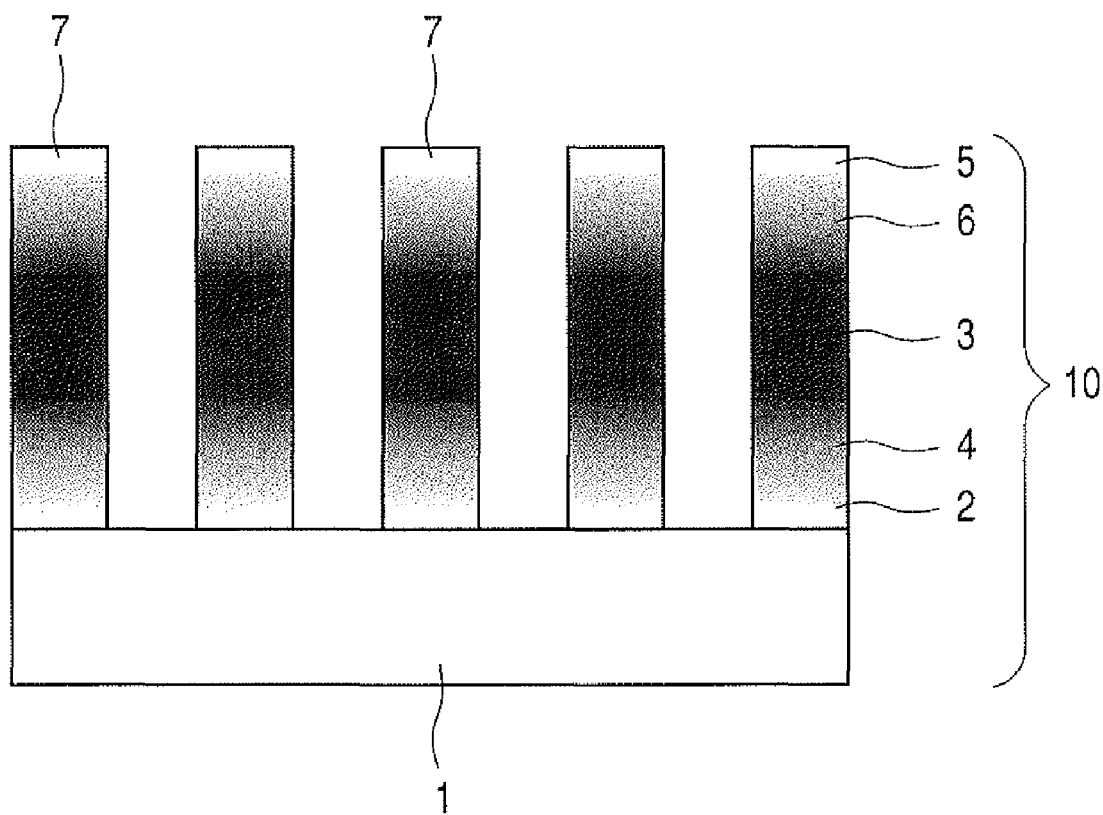
FIG. 1 is a sectional view of a waveplate in a first embodiment.

FIG. 1 shows a sectional view of a waveplate in a first embodiment.

The waveplate in the first embodiment is a waveplate including relief-shaped (rugged) gratings formed as a microperiodic structure on a deposited film 10 composed of a dielectric medium. A refractive index of the deposited film 10 is inclined and changes in a film thicknesswise direction. Namely, the deposited film 10 is an inclined film.

Next, a manufacturing method of the waveplate in the first embodiment will be described.

To begin with, a material gas is introduced onto a dielectric substrate 1 having a refractive index n1, thereby forming a film of a dielectric medium 2 having a refractive index n2 that is approximate to or the same as the refractive index n1 over the surface.

Subsequently, a material gas is introduced onto the film of the dielectric medium 2 together with the material gas of the dielectric medium 2 while gradually changing flow rates of the two material gases so as to increase step by step a mixture ratio of a dielectric medium 3 having a refractive index n3 larger than the refractive index n1 with respect to the dielectric medium 2.

Then, a dielectric medium mixed film 4 constructed of the dielectric medium 2 and the dielectric medium 3 is grown on the film of the dielectric medium 2. After a rate of the dielectric medium 3 in the dielectric medium mixed film 4 has reached 100%, a film of the dielectric medium 3 is grown up to an arbitrary film thickness while being kept in a 100% state.

Further, the material gases of the dielectric medium 3 and a dielectric medium 5 are introduced onto the film of the dielectric medium 3 while gradually changing the flow rates of the material gases of the dielectric medium 3 and the dielectric medium 5 so as to increase step by step the mixture ratio of the dielectric medium 5 having a refractive index smaller than the refractive index n3 of the dielectric medium 3 with respect to the dielectric medium 2. A dielectric medium mixed film 6 constructed of the dielectric medium 3 and the dielectric medium 5 is grown on the film of the dielectric medium 3, an upper portion of the mixed film 6 is grown so that the dielectric medium 5 comes to a rate of 100%, and a film of the dielectric medium 5 is grown up to an arbitrary film thickness.

Thus, a deposited film 10 composed of the dielectric medium having the inclined refractive index is obtained. The deposited film 10 is formed with relief-shaped gratings 7 as illustrated in FIG. 1 by etching. The relief-shaped gratings 7 in the first embodiment can reduce reflection on an interface because of a refractive index difference on the interface with the dielectric substrate 1 being the same or close. Moreover, the refractive index of the dielectric medium 5 on the surface of the deposited film 10 is small, and hence the reflection on the surface can be also decreased.

It is feasible to acquire the waveplate having a high average refractive index and capable of restraining the reflection on the surface and the reflection on the interface with the dielectric substrate 1.

Figure 2:
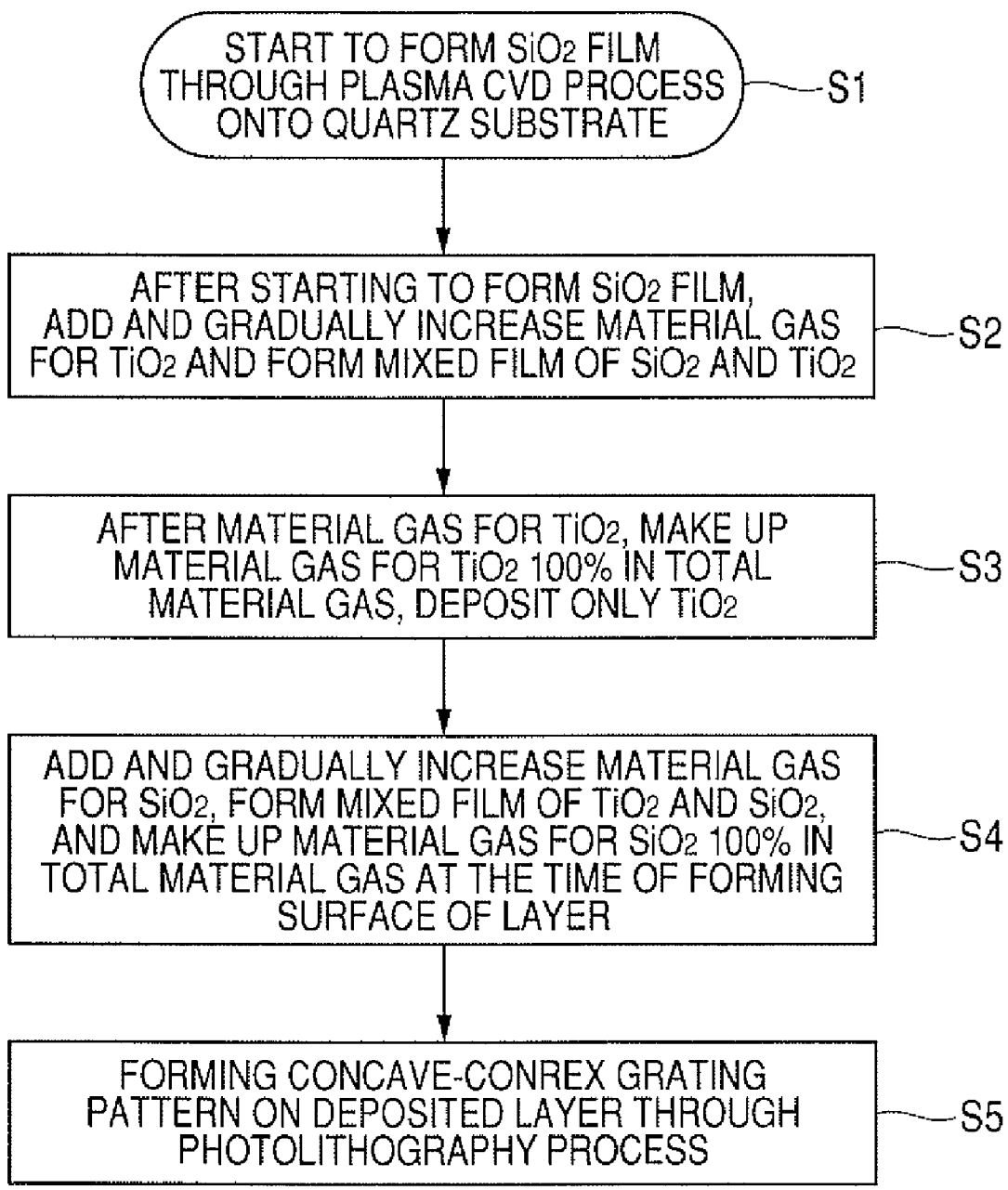
FIG. 2 is a flowchart of a process in the first embodiment.

A specific method of manufacturing the waveplate in the first embodiment will hereinafter be described. FIG. 2 is a flowchart of a process in the first embodiment.

To start with, in step S1, the dielectric substrate 1 composed of a quartz wafer is disposed in a vacuum container, and $Si(OC_2H_5)_4$ (which will hereinafter be referred to as TEOS) is introduced as a material gas of a $SiO_2$ film into the vacuum container. Then, the TEOS defined as the material gas is decomposed and deposited onto the substrate 1 by use of a plasma CVD method, thereby growing the $SiO_2$ film as a first dielectric medium.

Subsequently, in step S2, a dielectric medium mixed film composed of $SiO_2$ and $TiO_2$ defined as a material having a higher refractive index than $SiO_2$ is grown on the $SiO_2$ film grown in step S1. The material gas is introduced in a way that gradually increases a ratio of Ti $(I—OC_3H_7)_4$ (which will hereinafter be termed TTIP) to the TEOS, thus growing a dielectric mixed film composed of $SiO_2$ and $TiO_2$. On this occasion, an element composition ratio of Si and Ti is gradually changed together with the growth of the deposited film defined as the dielectric mixed film by increasing step by step the ratio of the TTIP, thereby enabling a characteristic of the refractive index to be gradually varied.

In step S3, in a state where the ratio of $TiO_2$ in this dielectric mixed film reaches 100%, a $TiO_2$ film serving as a second dielectric medium is grown till a predetermined film thickness is reached.

Subsequently, in step S4, the material gas is introduced while gradually increasing a ratio of the TEOS to the TTIP, thereby growing a dielectric mixed film composed of $SiO_2$ and $TiO_2$ on the $TiO_2$ film. A deposited film having an inclined refractive index is grown in a way that gradually increases the ratio of $SiO_2$, setting the ratio of $SiO_2$ at 100% as the first dielectric medium on the surface and gradually changing the element composition ratio of the two types of elements such as Si and Ti in the film thicknesswise direction.

Figure 3:
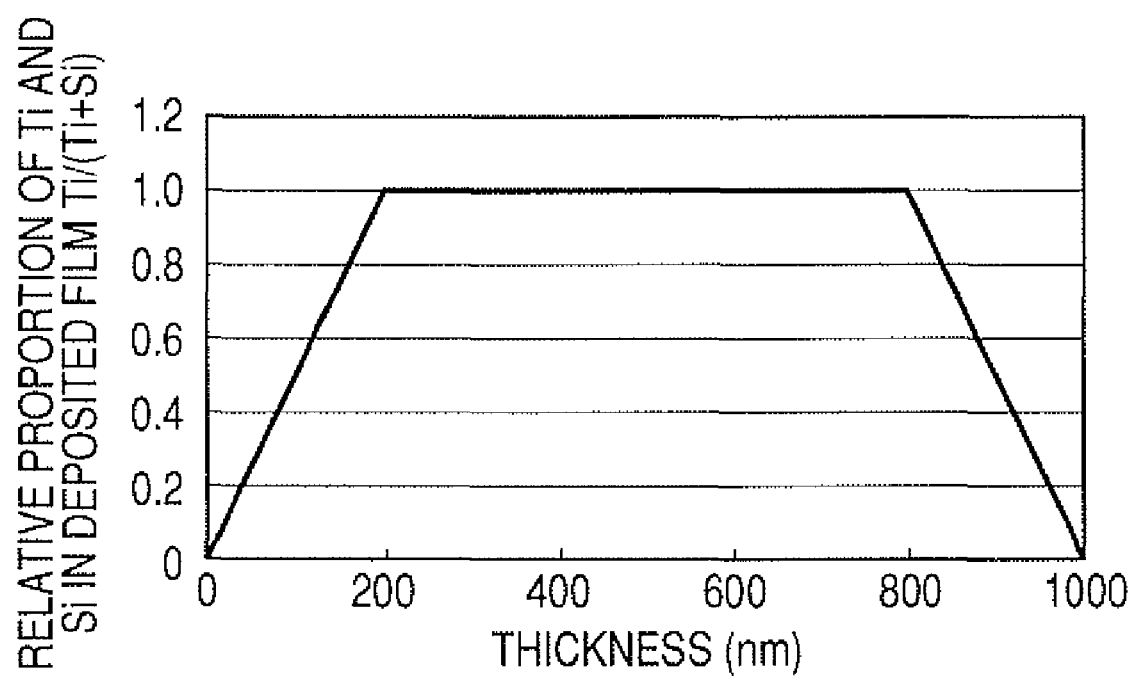
FIG. 3 is a graph of a composition ratio of a mixed film in the first embodiment.

FIG. 3 illustrates a film composition ratio of $SiO_2$ and $TiO_2$. The mixed film of $TiO_2$ and $SiO_2$ is grown up to a film thickness of 1000 nm while controlling the flow rates of the material gases such as the TEOS and the TTIP. The characteristic of the refractive index, which is similarly proportional to the film composition ratio, is obtained.

Finally in step S5, the deposited film of $SiO_2$ and $TiO_2$, which is acquired in step S4, undergoes $CF_4$ dry etching by a photolithography process. This process enables formation of the relief-shaped gratings 7 taking the periodic structure, of which grating pitch is equal to or smaller than a wavelength of an incident light, by patterning with a grating pitch of 0.26 μm.

The waveplate in the first embodiment has no difference in the refractive index between the dielectric substrate 1 and the SiO$_2$ film defined as the first dielectric medium 2 and is therefore capable of reducing the reflection on the dielectric substrate 1 and the reflection on the interface with the relief-shaped gratings 7. Moreover, a fifth dielectric medium 5 constituting the surface of the deposited film 10 is also the SiO$_2$ film and has a relatively small refractive index, whereby the reflection of the surface of the deposited film 10 can be reduced. The average refractive index of the deposited film 10 is, however, high, so that the thickness of the deposited film 10 can be decreased, and the etching of the deposited film 10 is facilitated. Accordingly, the waveplate, which is easy to manufacture, low of cost but ample of productivity and has a high transmittance, is acquired. The first embodiment has employed the two types of material gases of Si and Ti and may involve using three or more types of material gasses.

A phase retardation ΔΦ received by the light incident on the relief-shaped gratings 7 is proportional to a groove depth D of the gratings and a magnitude Δn of birefringence. Such being the case, as described above, a dielectric medium (the same dielectric medium as the dielectric substrate 1) having the same refractive index as that of the dielectric substrate 1 or a dielectric medium having a refractive index approximate to that of the dielectric substrate 1 and a dielectric medium having a refractive index sufficiently larger than that of the dielectric substrate 1, are grown on the dielectric substrate 1 so as to gradually change the element composition ratio. The deposited film 10, which is, though high of the refractive index of the whole deposited film 10, small of the refractive index difference on the surface and small of the refractive index difference on the interface with the dielectric substrate, can be grown.

Incidentally, the waveplate comes to have the small reflectance and the high transmittance because of small refractive index differences between the dielectric substrate and the interface of the deposited film and between the surface of the deposited film and the air. Further, the deposited film 10 is the single-layered inclined film having the inclined refractive index and has therefore no reflection on the interface of the film such as a laminated film.

Second Embodiment

Next, the waveplate according to a second embodiment will be described.

A construction of the waveplate in the second embodiment is substantially the same as the waveplate in the first embodiment illustrated in FIG. 1 has, and hence its in-depth description is omitted. A difference of the waveplate according to the second embodiment from the waveplate according to the first embodiment is such a point that TiO$_2$ is replaced by Ta$_2$O$_5$ as the dielectric medium.

Figure 4:
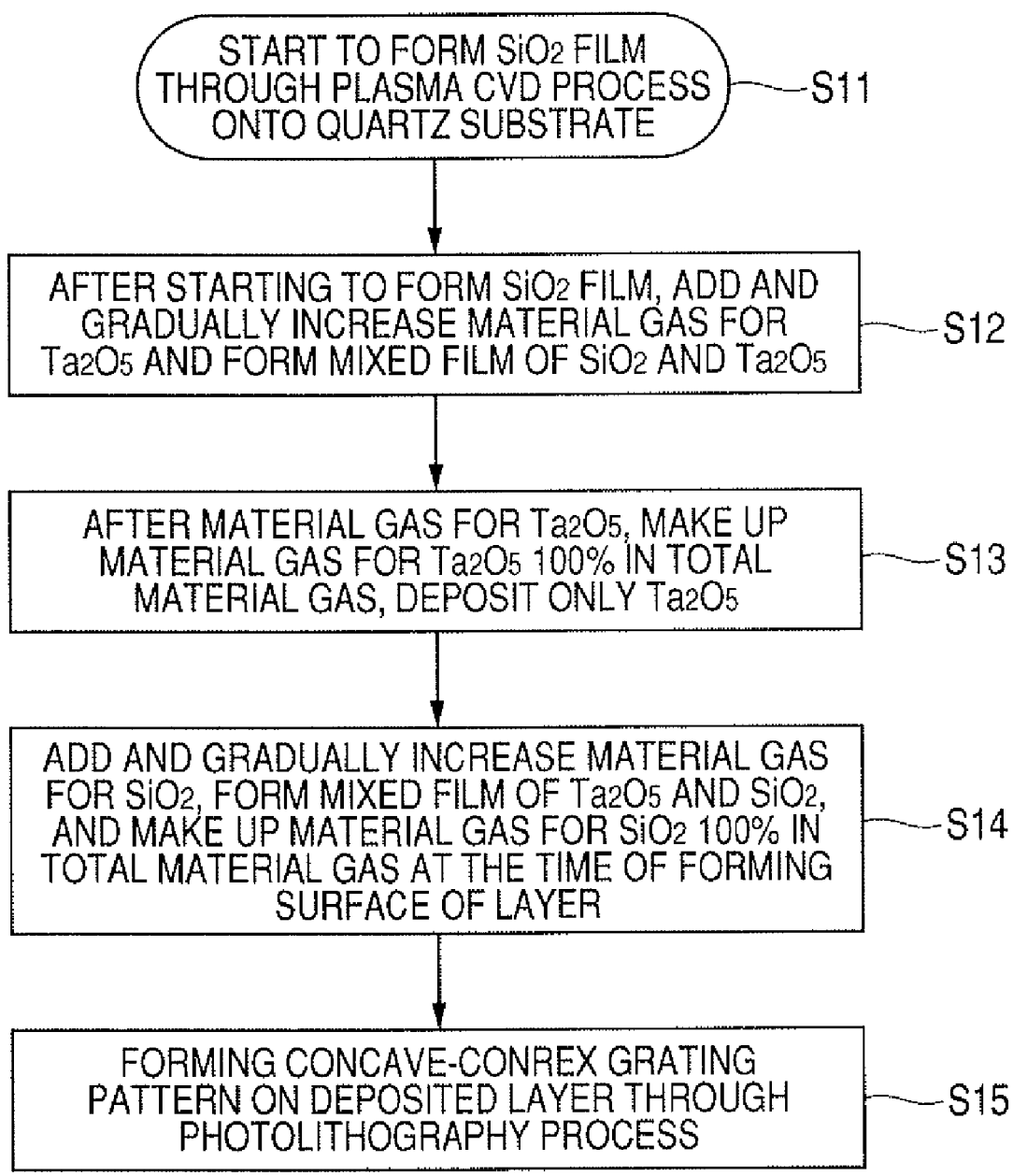
FIG. 4 is a flowchart of a process in a second embodiment.

FIG. 4 is a flowchart of the process in the second embodiment.

In the same way as in the first embodiment, to begin with, in step S11, the dielectric substrate composed of the quartz wafer is disposed in the vacuum container, and the SiO$_2$ film starts being grown on this substrate by use of the plasma CVD method. The TEOS is used as the material gas for the SiO$_2$ film in the same way as in the first embodiment.

Figure 5:
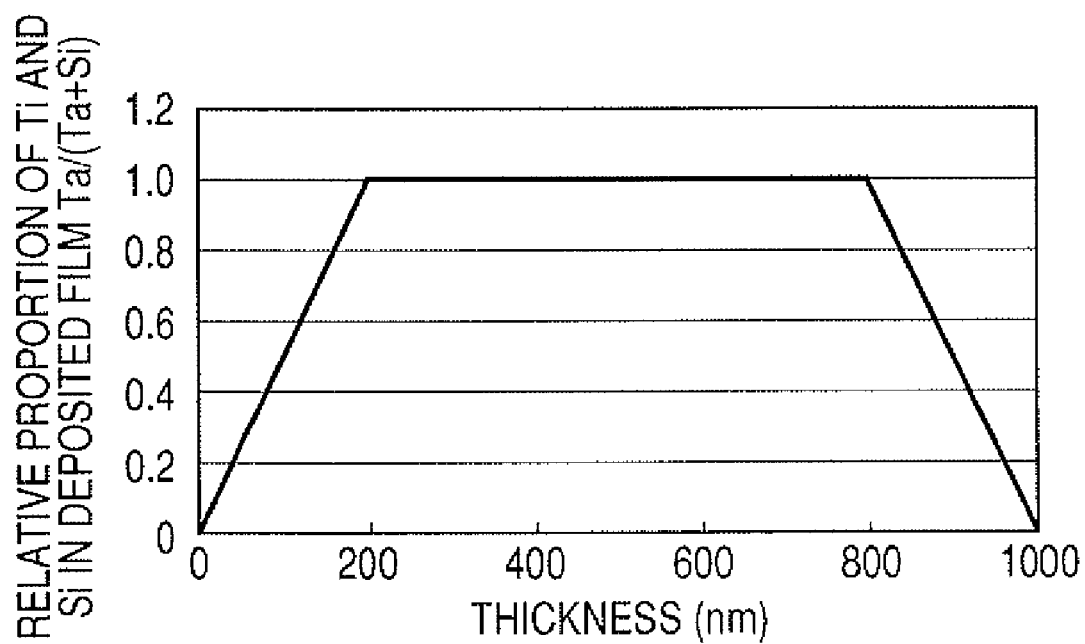
FIG. 5 is a graph of a composition ratio of a mixed film in the second embodiment.

In step S12, after the start of growing the SiO$_2$ film, Ta(OC$_2$H$_5$)$_5$ as a material gas of Ta$_2$O$_5$ with an increased refractive index is introduced in a way that increases a ratio of Ta(OC$_2$H$_5$)$_5$ with respect to the TEOS. A dielectric mixed film composed of Ta$_2$O$_5$ and SiO$_2$ is grown while controlling the flow rate of the material gas so as to attain the composition ratio illustrated in FIG. 5. In step S13, in a state where the ratio of Ta$_2$O$_5$ becomes 100%, the Ta$_2$O$_5$ film is grown till reaching a predetermined film thickness.

Subsequently in step S14, the TEOS is introduced while increasing stepwise the ratio of the TEOS with respect to Ta(OC$_2$H$_5$)$_5$, and a dielectric mixed film composed of SiO$_2$ and Ta$_2$O$_5$ is grown. Then, the ratio of SiO$_2$ is made to reach 100% on the surface by increasing stepwise the ratio of SiO$_2$, thereby growing the deposited film having the element composition of two types of elements such as Si and Ta and having the refractive index that changes gradually in the thickness-wise direction.

In step S15, the deposited film 10 of Ta$_2$O$_5$ and SiO$_2$ is subjected to the CF$_4$ dry etching by the photolithography process, thereby conducting the patterning with the grating pitch of 0.26 μm and forming the relief-shaped gratings 7 taking the periodic structure, which is equal to or smaller than the wavelength of the incident light.

In the second embodiment, similarly to the first embodiment, there is no refractive index difference between the dielectric substrate and the SiO$_2$ film, and therefore the reflection on the interface is small. Further, the surface of the deposited film is also the SiO$_2$ film, and hence the reflection on the surface of the deposited film is comparatively small. The waveplate is formed of the deposited film 10 having the high average refractive index, thereby enabling the grooves of the gratings to be shallowed and facilitating the etching process. Accordingly, the waveplate, which is easy to manufacture, low of the cost but ample of the productivity and has the high transmittance, is acquired.

The first embodiment and the second embodiment have involved using the material gases each containing atoms such as Ti and Ta and may also involve employing material gases containing atoms such as Nb, Zr, Al and Hf.

The thus manufactured phase grating type waveplate can be employed in a measuring apparatus and a variety of optical apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the present invention can be applied to a waveplate that causes phase delay differences such as λ, λ/2 and λ/4 with respect to a wavelength λ of the incident light. Moreover, the design wavelength and the period of the periodic structure can be also changed.

This application claims the benefit of Japanese Patent Application No. 2006-351095, filed Dec. 27, 2006, which is hereby incorporated by reference herein in its entirety.

What is claimed is:

1. A waveplate comprising:
   a dielectric substrate; and
   a periodic structure formed on said dielectric substrate, said periodic structure having a period which is equal to or smaller than a wavelength of an incident light,
   wherein said periodic structure is constructed of a deposited film,
   wherein a refractive index of said deposited film gradually changes in a thickness-wise direction of said deposited film, such that the refractive index (1) gradually increases in a first part, extending from a surface of said deposited film to a first intermediate portion of said deposited film, (2) is a constant value equal to a value at the first intermediate portion in a second part, extending between the first intermediate portion and a second intermediate portion of said deposited film, and (3) gradually decreases from the constant value in a third part, extending from the second intermediate portion to an interface of said deposited film with said dielectric substrate, and wherein said deposited film is composed of a composition of $SiO_2$ and $TiO_2$ in the first and third parts, said deposited film is composed of $TiO_2$ in the second part, and the second part is the thickest of the first to third parts.

2. A waveplate according to claim 1, wherein a composition ratio of $SiO_2$ and $TiO_2$ gradually changes in the thickness-wise direction in the first and third parts.

3. A waveplate manufacturing method comprising:
forming a deposited film on a dielectric substrate; and
forming a periodic structure having a period which is equal to or smaller than a wavelength of an incident light on said deposited film,
wherein said deposited film forming step includes gradually changing a composition ratio of $SiO_2$ and $TiO_2$ constituting said deposited film along with growth of said deposited film, so that a refractive index of said deposited film (1) gradually increases in a first part, extending from a surface of said deposited film to a first intermediate portion of said deposited film, (2) is a constant value equal to a value at the first intermediate portion in a second part, extending between the first intermediate portion and a second intermediate portion of said deposited film, and (3) gradually decreases from the constant value in a third part from the second intermediate portion to an interface of said deposited film with said dielectric substrate, and
wherein said deposited film is composed of a composition of SiO2 and TiO2 in the first and third parts, said deposited film is composed of TiO2 in the second part, and the second part is the thickest of the first and third parts.

4. A waveplate manufacturing method according to claim 3, wherein said deposited film is formed by a plasma CVD method, and
said deposited film forming step includes gradually changing of a mixture ratio of plural types of material gases along with the growth of said deposited film in the first and third parts.

5. A waveplate comprising:
a dielectric substrate; and
a periodic structure formed on said dielectric substrate, said periodic structure having a period which is equal to or smaller than a wavelength of an incident light,
wherein said periodic structure is constructed of a deposited film,
wherein a refractive index of said deposited film gradually changes in a thicknesswise direction of said deposited film, such that the refractive index (1) gradually increases in a first part, extending from a surface of said deposited film to a first intermediate portion of said deposited film, (2) is a constant value equal to a value at the first intermediate portion in a second part, extending between the first intermediate portion and a second intermediate portion of said deposited film, and (3) gradually decreases from the constant value in a third part, extending from the second intermediate portion to an interface of said deposited film with said dielectric substrate, and wherein said deposited film is composed of a composition of $SiO_2$ and $Ta_2O_5$ in the first and third parts, said deposited film is composed of $Ta_2O_5$ in the second part, and the second part is the thickest of the first to third parts.

6. A waveplate according to claim 5, wherein a composition ratio of $SiO_2$ and $Ta_2O_5$ gradually changes in the thicknesswise direction in the first and third parts.

7. A waveplate manufacturing method comprising:
forming a deposited film on a dielectric substrate; and
forming a periodic structure having a period which is equal to or smaller than a wavelength of an incident light on said deposited film,
wherein said deposited film forming step includes gradually changing a composition ratio of $SiO_2$ and $Ta_2O_5$ constituting said deposited film along with growth of said deposited film, so that a refractive index of said deposited film (1) gradually increases in a first part, extending from a surface of said deposited film to a first intermediate portion of said deposited film, (2) is a constant value equal to a value at the first intermediate portion in a second part, extending between the first intermediate portion and a second intermediate portion of said deposited film, and (3) gradually decreases from the constant value in a third part, extending from the second intermediate portion to an interface of said deposited film with said dielectric substrate, and
wherein said deposited film is composed of a composition of $SiO_2$ and $Ta_2O_5$ in the first and third parts, said deposited film is composed of $Ta_2O_5$ in the second part, and the second part is the thickest of the first to third parts.

8. A waveplate manufacturing method according to claim 3, wherein said deposited film is formed by a plasma CVD method, and
said deposited film forming step includes gradually changing of a mixture ratio of plural types of material gases along with the growth of said deposited film in the first and third parts.

* * * * *